United States Patent [19]

Hightower, Jr.

[11] E Patent Number: Re. 32,506

[45] Reissued Date of Patent: Sep. 22, 1987

[54] SNAKE PROOF CHAPS

[75] Inventor: George H. Hightower, Jr., Thomaston, Ga.

[73] Assignee: Thomaston Mills, Inc., Thomaston, Ga.

[21] Appl. No.: 575,296

[22] Filed: Jan. 30, 1984

Related U.S. Patent Documents

Reissue of:

[64] Patent No.: 4,382,301
Issued: May 10, 1983
Appl. No.: 273,067
Filed: Jun. 12, 1981

[51] Int. Cl.[4] ..... A41D 13/06; F41H 1/02

[52] U.S. Cl. ..... 2/22; 2/2.5; 36/2 R

[58] Field of Search ..... 2/22, 23, 24, 2, 2.5, 2/79; 36/2 R, 2 B

[56] References Cited

U.S. PATENT DOCUMENTS

| | | | |
|---|---|---|---|
| 361,360 | 4/1887 | Hunt | 2/243 A |
| 2,720,040 | 10/1955 | Rogers | 36/2 R |
| 2,744,846 | 5/1956 | Stickles | 2/2.5 X |
| 2,816,578 | 12/1957 | Frieder et al. | 2/2.5 X |
| 3,153,864 | 10/1964 | Brewer | 2/22 X |
| 3,191,185 | 6/1965 | Martin | 2/22 |
| 3,269,036 | 8/1966 | Parker et al. | 36/2 B |
| 3,562,810 | 2/1971 | Davis | 2/2.5 |
| 3,758,963 | 9/1973 | Knight | 36/2 R |
| 3,902,196 | 9/1975 | Reinfandt | 2/2.5 |
| 4,057,853 | 11/1977 | McLane | 2/22 |

FOREIGN PATENT DOCUMENTS 811102 8/1951 Fed. Rep. of Germany .

*Primary Examiner*—Louis K. Rimrodt
*Attorney, Agent, or Firm*—Kerkam, Stowell, Kondracki & Clarke

[57] ABSTRACT

A protective garment for shielding a wearer from snake bites is disclosed. The garment is a legging made of basket weave with two ends drawn as one and two picks per shed. A coating of polyurethane is included on the inside of the basket weave fabric.

27 Claims, 3 Drawing Figures

SNAKE PROOF CHAPS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a protective article of clothing and more particularly to leggings which are adapted to surround the legs of a wearer whereby they are protected from snake bites.

2. Description of the Prior Art

The use of protective legging is well known in the art. In particular, hunters, hikers, and other outdoorsmen have used various protective leggings to protect against snake bites when walking through heavy undergrowth areas.

U.S. Pat. No. 3,269,036, issued to Parker et al on Aug. 30, 1966, discloses a protective legging including a protective sheet made of aluminum or similar material.

U.S. Pat. No. 3,191,185, issued to Martin on June 29, 1965, discloses a protective legging having two fabric concentric cylinders with a lining of light-weight plastic material such as styrofoam. The legging is disclosed as being preferentially of a thickness of about five-sixths of an inch. Although the fabric is penetrable by the fangs of a snake, the thickness of the plastic material layer prevents the fangs from reaching the inner fabric cylinder, thereby protecting the legs of the wearer.

U.S. Pat. No. 4,057,853 issued to McLane on Nov. 15, 1977, discloses a protective legging having a double layer of closely woven stainless steel mesh to protect the wearer against snake bites.

Although the prior art snake leggings or snake chaps have been generally useful in lessening the risk that the wearer will be bitten by a snake, these prior art snake leggings have been subject to one or more of several disadvantages. In particular, the prior art snake chaps or leggings have often been quite heavy because of the perceived need to use metallic materials to protect against the snake's fangs. Moreover, the use of metallic materials has often required rather complex structures for the legging, the complex structure including a plurality of fastening means to allow the legging to be secured to the leg of a wearer. Those leggings which use extra thickness to protect against a snake's fangs are generally cumbersome to put on and wear.

It is therefore a principal object of the present invention to provide a new and improved light-weight snake legging or snake chaps.

A further object of the present invention is to provide a snake legging which is made of relatively thin material.

A further object of the present invention is to provide a snake legging which is shaped to provide maximum protection to the wearer while maintaining simplicity in form and construction.

SUMMARY OF THE INVENTION

The above and other objects of the present invention are accomplished by a generally tubular leg enclosing portion made of a woven fabric of nylon impervious to snake bites and having an upper part and a lower part. Preferably, the woven fabric is a basket weave with two ends drawn as one and two picks per shed and having a coating of polyurethane on its inside. The basket weave is preferably made of threads between 900 and 1100 denier and weights between 8.0 and 12.0 ounces per square yard, the coating weighing between 1 and 2 ounces per square yard. The lower part of the leg-enclosing portion includes a fastener, preferably a zipper, operable to connect two side edges of the lower part. A securing piece is attached to the upper part for holding the leg enclosing portion up on a wearer's leg, the securing piece preferably being a strap adapted to connect to a belt worn by the wearer of the article. The upper part includes a recessed part and a rise part.

BRIEF DESCRIPTION OF THE DRAWINGS

These and other features of the present invention and the attendant advantages will be readily apparent to those having ordinary skill in the art and the invention will be more easily understood from the following detailed description of the preferred embodiment of the present invention taken in conjunction with the accompanying drawings wherein.

DESCRIPTION OF THE PREFERRED EMBODIMENTS

Figure 1:
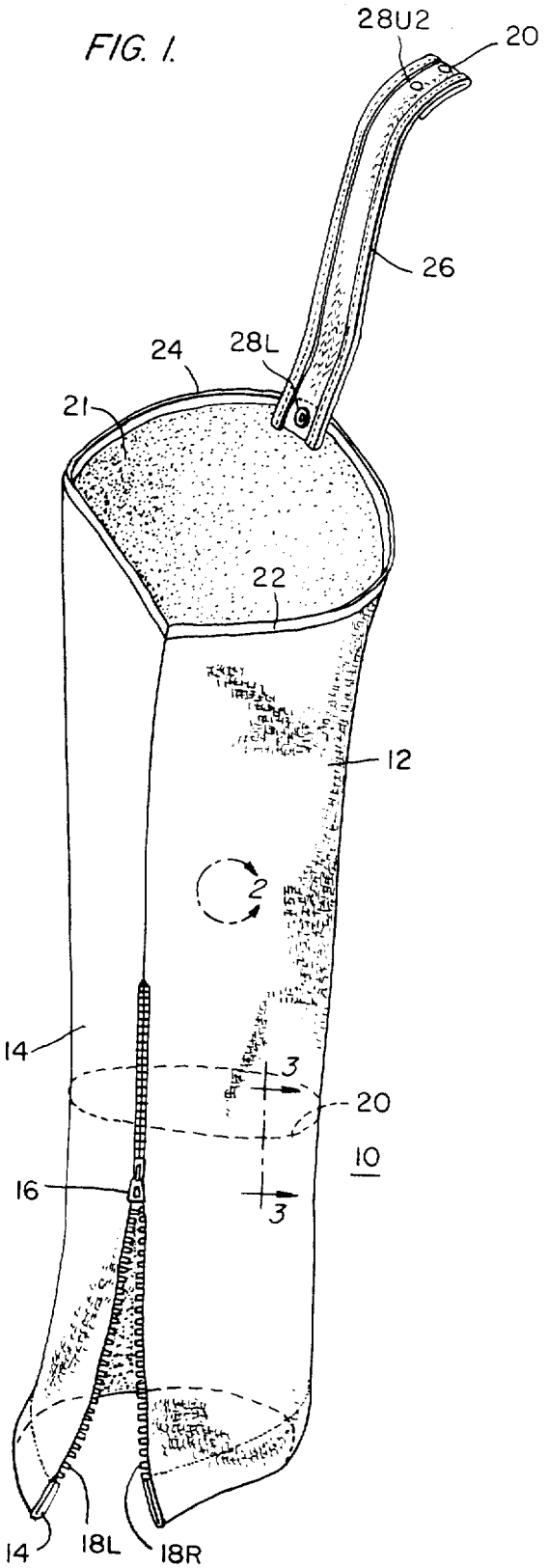
FIG. 1 shows the preferred embodiment of the present invention with its zipper in an up position.

As shown in the drawings, the protective article of clothing of the present invention is a legging or chap 10 adapted to be worn on the leg of a wearer. The legging 10 includes a generally tubular leg enclosing portion having an upper part 12 and a lower part 14. The lower part 14 includes two side edges 18R and 18L which may be connected by a zipping down zipper 16 after a wearer has inserted his leg into the leg enclosing portion. As indicated in the drawing by sewing line 20, the woven fabric of the leg enclosing portion is preferably doubled up for two layers throughout most of the lower part 14. The use of two fabric layers for most of lower part 14 is useful in providing the maximum amount of protection for that part of the leg most likely to be bitten by a snake. A cuff 19 is located at the bottom of the legging.

Adjacent the top of upper part 12, there is a recessed part 22 adapted to accommodate the crotch of a wearer. Opposite the recessed part 22 on the generally tubular structure is a rise part 24 which will be worn on the side of a wearer's hip. Attached to rise part 24 is a strap 26 having snap fasteners 28L, 28U1, 28U2. Snap fastener 28L secures strap 26 to the rise part 24 and extends out on the outside of the rise part 24. By folding over the strap 26, either of upper snaps 28U1 and 28U2 may be snapped to lower snap 28L thereby forming a loop out of strap 26. A belt (not shown) worn by a wearer of the legging may extend through the loop formed from strap 26, thereby functioning as a securing piece for holding the leg enclosing portion up on the wearer's leg.

The generally tubular leg enclosing portion having upper part 12 and lower part 14 is made of a woven fabric of nylon resistant to snake bites. More specifically, the fabric construction is a basket weave having 46 ends per inch (warp) by 42 ends per inch (filling) with two ends drawn as one (warp) and two picks per shed (filling). Preferably, the nylon fiber is nylon type 6,6 in the form of continuous filament yarn such as sold by DuPont under the trademark Cordura. The basket weave should be made of threads between 900 and 1100 denier with 1000 denier being the preferred value. The basket weave weighs between 8.0 and 12.0 ounces per square yard with 9.9 ounces per square yard being the preferred value.

Figure 3:
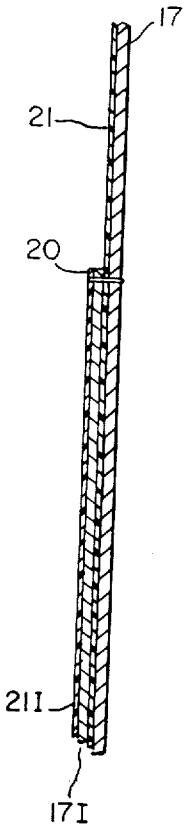
FIG. 3 shows the cross-section of the double layer portion at the bottom of the snake chap.
Figure 2:
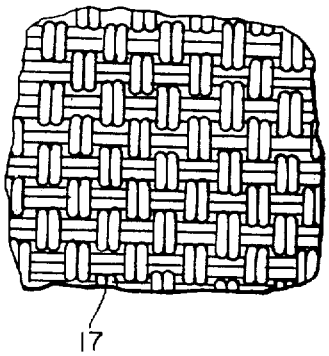
FIG. 2 shows a close-up of the woven fabric used for the snake chap of the present invention.

In addition to the strength provided by the continuous filament of nylon fiber arranged in the basket weave configuration shown in FIG. 2, the basket weave fabric includes on its inside (that side closest the wearer) a coating 21I of synthetic rubber polymer. As shown in FIG. 3, the cross-section of the double layer below line 20 would include an outer basket weave fabric 17 having polyurethane coating 21 and an inner basket weave fabric 17I having polyurethane coating 21I. In the preferred embodiment, the coating is polyurethane applied between one and two ounces per square yard with 1.5 ounces per square yard being the ideal. Whereas such a coating is quite thin, it is quite sufficient to render the woven fabric of the leg enclosing portion impervious to snake bites, especially for the double layer portion below line 20.

As part of a test of the present invention, the following listed snakes were used:

| | | |
|---|---|---|
| 2 | Cottonmouth Water Moccasin | Medium Size-3 feet Very sharp fangs-length approximately ½ inch |
| 1 | Diamondback Rattlesnake | Large Size-5 feet Sharp fangs-length approximately ¾ inch |
| 1 | Diamondback Rattlesnake | Medium size-4 feet Sharp fangs-length approximately ⅜ inch |
| 2 | Diamondback Rattlesnakes | Small Size-24/30 inches |

Each snake was made to repeatedly bite the double layer part (below line 20) of the snake proof chaps. Although the snakes repeatedly bit very hard into the chaps, none of the snake fangs penetrated the chaps.

It should additionally be noted that the woven fabric of the present invention is less than one-quarter of an inch in thickness even in the double layer part below line 20. This is substantially less than the length of the fangs for the snakes listed above. It will thus be appreciated that the present invention provides protection from snake fangs by the particular fabric weave with coating of synthetic rubber polymer, as opposed to providing a chap which protects by virtue of its thickness. As noted above, this avoids the problem of an overly thick chap which is cumbersome to put on and wear.

Although various materials, constructions and specifics of the present invention have been described herein in detail, it is to be understood that these are for illustrative purposes only. Various modifications and adaptions will be readily apparent to those of ordinary skill in the art. Accordingly, the scope of the present invention should be determined with reference to the appended claims.

What is claimed is:

1. A protective article of clothing adapted to prevent snake fangs from biting into the leg of a wearer, said protective article comprising:

(a) a generally tubular leg enclosing portion made of a woven fabric of nylon resistant to snake bites and having an upper part and a lower part, said lower part including a fastener for connecting two side edges of the lower part, and (b) a securing piece attached to said upper part for holding the leg enclosing portion up on a wearer's leg, and wherein said leg enclosing portion comprises a basket weave fabric, said basket weave fabric comprises nylon fiber in the form of a continuous filament yarn, said basket weave fabric is made of threads between 900 and 1100 denier and weighs between 8.0 and 12.0 ounces per square yard.

2. The article of claim 1 wherein said securing piece is a strap adapted to form a loop for accommodating a belt worn by the wearer of the article.

3. The article of claim 2 wherein said upper part includes a recessed part adapted to accommodate the crotch of a wearer and a rise part opposite the recessed part, said rise part adapted to be worn on the side of a wearer's hip, said strap extends from said rise part, and said fastener is a zipper.

4. The article of claim 1 wherein said leg enclosing portion prevents penetration by snake fangs even when the snake fangs are longer than the thickness of the leg enclosing portion.

5. The article of claim 1 wherein the inside of said basket weave fabric has a coating of a synthetic rubber polymer.

6. The article of claim 5 wherein said coating of synthetic rubber polymer is a polyurethane coating.

7. The article of claim 1 wherein said basket weave fabric has two ends drawn as one and two picks per shed.

8. The article of claim 7 wherein the inside of said basket weave fabric has a coating of a synthetic rubber polymer, and said lower part includes two layers of said basket weave fabric.

9. The article of claim 8 wherein said coating is a polyurethane coating.

10. The article of claim 9 wherein said coating is between 1 and 2 ounces per square yard.

*11. A protective article of clothing adapted to prevent snake fangs from biting into the leg of a wearer, said protective article comprising:*

*(a) a generally tubular leg enclosing portion made of a woven fabric of nylon resistant to snake bites and having an upper part and a lower part, said lower part including a fastener for connecting two side edges of the lower part, and*

*(b) a securing means attached to said upper part for holding the leg enclosing portion up on a wearer's leg, and*

*wherein said leg enclosing portion comprises nylon fiber in the form of continuous filament yarn, said woven fabric is made of threads between 900 and 1100 denier and wherein said leg enclosing portion prevents penetration by snake fangs even when the snake fangs are longer than the thickness of the leg enclosing portion, and said leg enclosing portion is less than ¼" in thickness.*

*12. The article of claim 11 wherein said woven fabric weighs between 8.0 and 12.0 ounces per square yard.*

*13. The article of claim 11 wherein the inside of said woven fabric has a coating of a synthetic rubber polymer.*

*14. The article of claim 13 wherein said coating is a coating of polyurethane of between 1 and 2 ounces per square yard.*

*15. A protective article of clothing adapted to prevent snake fangs from biting into the leg of a wearer, said protective article comprising:*

(a) a generally tubular leg enclosing portion made of a woven fabric of nylon resistant to snake bites and having an upper part and a lower part, said lower part including a fastener for connecting two side edges of the lower part, and (b) a securing means attached to said upper part for holding the leg enclosing portion up on a wearer's leg, and wherein said leg enclosing portion comprises nylon fiber in the form of a continuous filament yarn, said woven fabric weighs between 8.0 and 12.0 ounces per square yard, and wherein said leg enclosing portion prevents penetration by snake fangs even when the snake fangs are longer than the thickness of the leg enclosing portion, and said leg enclosing portion is less than ¼" in thickness.

16. The article of claim 15 wherein the inside of said woven fabric has a coating of a synthetic rubber polymer.

17. The article of claim 16 wherein said coating is between 1 and 2 ounces per square yard.

18. The article of claim 17 wherein said woven fabric is made of threads between 900 and 1100 denier.

19. A protective article of clothing adapted to prevent snake fangs from biting into the leg of a wearer, said protective article comprising:

(a) a generally tubular leg enclosing portion made of a woven fabric of nylon resistant to snake bites and having an upper part and a lower part, said lower part including a fastener for connecting two side edges of the lower part, and (b) a securing means attached to said upper part for holding the leg enclosing portion up on a wearer's leg, and wherein said leg enclosing portion comprises nylon fiber in the form of continuous filament yarn, wherein said leg enclosing portion comprises at most two layers of said woven fabric, and wherein said leg enclosing portion prevents penetration by snake fangs even when the snake fangs are longer than the thickness of the leg enclosing portion.

20. The article of claim 19 wherein said woven fabric is made of threads between 900 and 1100 denier.

21. The article of claim 20 wherein said woven fabric weighs between 8.0 and 12.0 ounces per square yard.

22. The article of claim 19 wherein said woven fabric weighs between 8.0 and 12.0 ounces per square yard.

23. A protective article of clothing adapted to prevent snake fangs from biting into the leg of a wearer, said protective article comprising:

(a) a generally tubular leg enclosing portion made of a woven fabric of nylon resistant to snake bites and having an upper part and a lower part, said lower part including a fastener for connecting two side edges of the lower part, and (b) a securing means attached to said upper part for holding the leg enclosing portion up on a wearer's leg, and said leg enclosing portion comprises nylon fiber in the form of continuous filament yarn, wherein said lower part includes more than one layer of said woven fabric and said upper part has fewer layers of said woven fabric than said lower part, and wherein said leg enclosing portion prevents penetration by snake fangs even when the snake fangs are longer than the thickness of the leg enclosing portion, and said leg enclosing portion is less than ¼" in thickness.

24. The article of claim 23 wherein said woven fabric weighs between 8.0 and 12.0 ounces per square yard.

25. The article of claim 24 wherein said woven fabric is made of threads between 900 and 1100 denier.

26. The article of claim 23 wherein said woven fabric is made of threads between 900 and 1100 denier.

27. The article of claim 23 wherein the inside of said woven fabric has a coating of a synthetic rubber polymer.

* * * * *